Nov. 17, 1970    C. W. FRANKLIN    3,540,089
SELF-RELEASING ANIMAL TETHER
Filed March 27, 1968    2 Sheets-Sheet 1
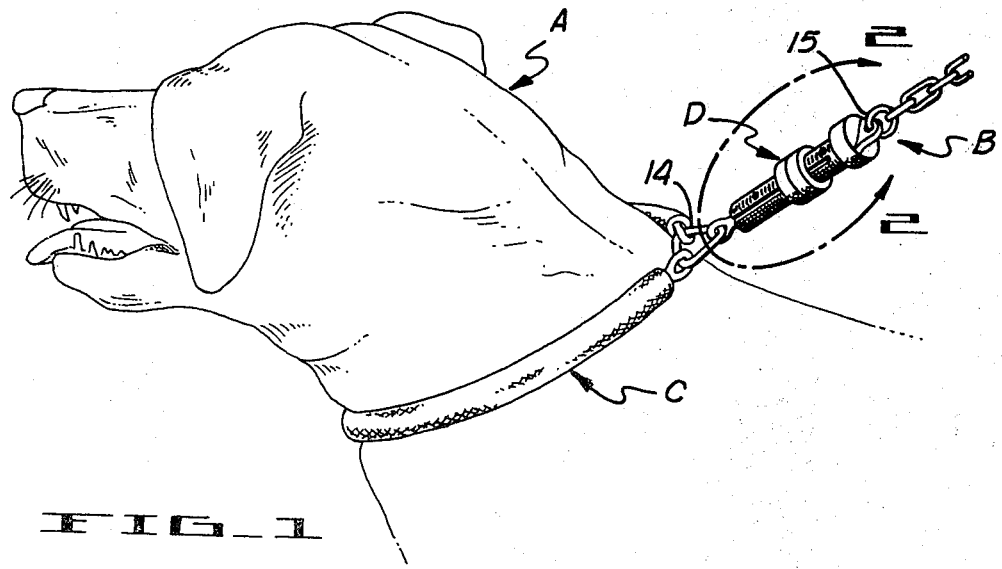
FIG_1
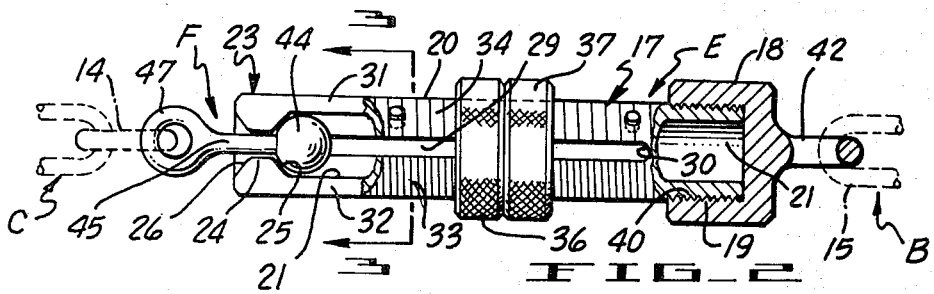
FIG_2
FIG_3
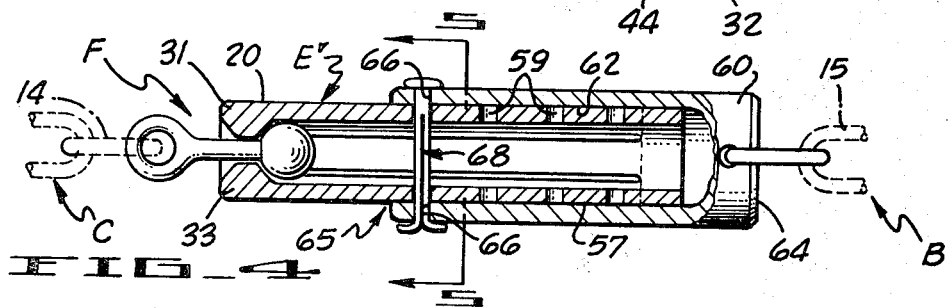
FIG_4
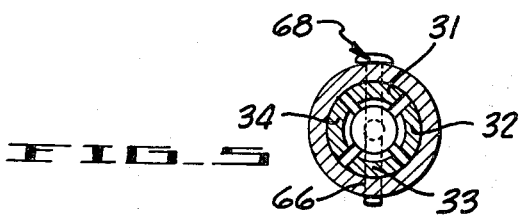
FIG_5
CLARENCE WILLARD FRANKLIN
INVENTOR.
BY Townsend Townsend
ATTORNEYS

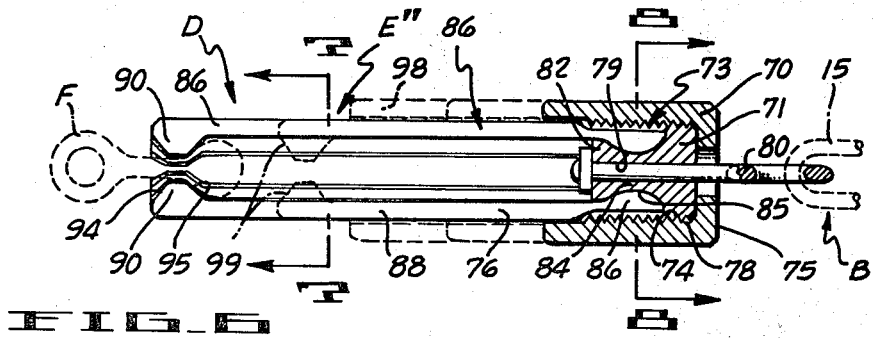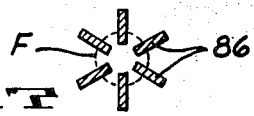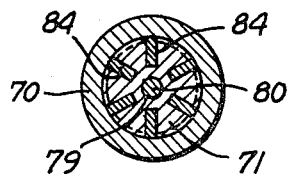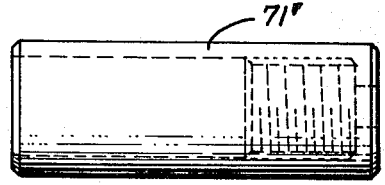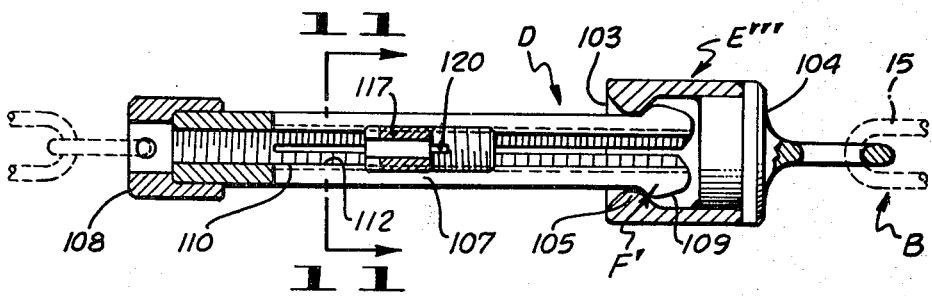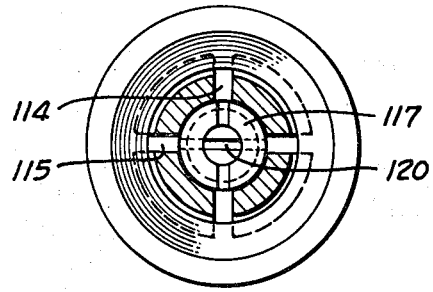

United States Patent Office 3,540,089
Patented Nov. 17, 1970

3,540,089
SELF-RELEASING ANIMAL TETHER
Clarence Willard Franklin, Cedar Tree Farm,
Milford, Calif. 96121
Filed Mar. 27, 1968, Ser. No. 716,454
Int. Cl. A44b *17/00*
U.S. Cl. 24—201                                    7 Claims

ABSTRACT OF THE DISCLOSURE

A self-releasing animal tether adapted to release upon tensile forces being exerted therethrough exceeding a selected and predetermined limit. A tether member is inserted as a segment of a tether and comprises a ball member fitting interiorly of and grasped by a socket member. Either the ball or socket is slotted, resilient and equipped with apparatus which varies the resiliency necessary to separate the attached ball and socket, parting the tether.

---

This invention relates to a self-releasing animal tether and more specifically to a ball and socket tether member which is adjustable to release upon a predetermined and preselected force being applied therethrough.

Animals, such as watchdogs and the like, are commonly attached to an elongate rope or tether permitting the animal to freely move within a set area or radius. Such tethers while restricting the movement of the animal in normal circumstances have the disadvantage of confining or restricting the animal in emergency situations, such as when the animal is exposed to fire, panicked or angered by an attack from an intruder or the like. In such emergency situations the animal, through the function of its adrenaline and alarm reaction, will have abnormal strength, which strength far exceeds that normally imposed on the tether. The present invention discloses a self-releasing mechanical fuse or tether member which can be installed as a segment of a tethering line. This tether member can be adjusted to the force required to effect its separation so as to release the tethered animal only when the adrenaline and alarm reaction in the animal cause forces exceeding the normal pull of the animal to be exerted thereon.

The tether member is adapted to part into separate members upon tensional forces exceeding a predetermined limit applied therethrough. This tether member is inserted as a segment of a tether line, and comprises a ball member inserted interior of and grasped by a socket member. Either the ball member or socket member is slotted so as to define resiliently conjoined segments. This slotted section has mounted thereto an adjustment apparatus which restricts that portion of the slotted and segmented member which can resiliently respond to the force exterted through the tether. Dependent upon the size and strength of the animal tethered, the adjustment apparatus can be positioned so as to maintain a connected tether line when normal tensional forces are exerted thereon by the animal and part the tether line when above normal tensional forces are exerted thereon by the animal.

In one embodiment the invention comprises an elongate and resilient socket member with a slot segmenting the socket. This socket is slotted from the open portion thereof to the medial portion of the member so as to define divided sections or segments of the socket resiliently conjoined. This divided socket is inserted as a segment of the tether line and grips the ball of the other member between its respective segments. The remaining tether member comprises a non-resilient ball and shaft connected to the ball, which shaft extends outwardly through the aperture of the socket to join the remaining segment of the tether line. The force necessary to separate the ball and socket is adjustable by a rigid sleeve affixed about the periphery of the resilient socket member. This sleeve is mounted to the socket member for movement towards and away from the divided or segmented sections of the socket. By moving the sleeve towards the segmented socket, the length of the socket member which can respond resiliently to forces exerted on the ball tending to part the segments of the socket is decreased, increasing the force necessary for the ball to part the tether. Conversely, by moving the sleeve away from the segmented portions of the socket, the length of the socket member which can respond resiliently to forces exerted on the ball tending to part the segments of the socket is increased, decreasing the force necessary to part the tether.

According to another embodiment of the present invention the socket is comprised of a plurality of elongate bars, each bar forming a longitudinal segment of the socket. These bars can be adjusted in both length and number so as to vary the forces necessary to separate the socket segments permitting the ball to pass therethrough.

A further embodiment of the present invention comprises a non-resilient socket with a slotted, bored and elongate resilient ball member inserted therein. This slotted and bored ball member withdraws from the non-resilient socket member by having the respective segments of the ball resiliently bent and compressed one towards another. In such bending and compressing, the ball member conforms to a diameter equal to that of the non-resilient socket so as to pass out of its gripping relation interior of the socket.

By the expedient of mounting a plug within the bore of the ball member, the force necessary to compress the resilient and segmented ball can be adjusted. When it is desired to increase the force necessary to compress the ball member, the plug is moved towards the ball, decreasing the portion of the slotted ball member which can resiliently respond to forces compressing the ball and increasing the force necessary to effect compression. Conversely when it is desired to decrease force necessary to compress the ball member, the plug is moved away from the ball, increasing the portion of the resilient slotted ball member which can respond to the forces compressing the ball and decreasing the forces necessary to effect compression.

Other objects, features and advantages of the present invention will be more apparent after referring to the following specification and attached drawing in which:

FIG. 1 is a tethered dog with the releaseable tethering member installed as a segment of the dog's tether;

FIG. 2 is an enlarged partial section of the releasable ball and socket tether member shown at 2—2 of FIG. 1;

FIG. 3 is a section of the tether member of FIGS. 1 and 2 taken along line 3—3 of FIG. 2;

FIG. 4 is an alternate embodiment of the tether member illustrating adjustment of the resilient force of the socket by a cylindrical member extending over the socket and affixed by a cotter key;

FIG. 5 is a section of the tether member of FIG. 4 taken along lines 5—5 thereof;

FIG. 6 is an additional embodiment of the tether member schematically illustrating the construction of the socket from a plurality of opposed bar members, the members being adjustable in number and length so as to vary the tensional forces applied on the socket;

FIG. 7 is a section of the tether of FIG. 6 taken along lines 7—7 illustrating the socket portion thereof;

FIG. 8 is a section of the tether of FIG. 6 taken along lines 8—8 thereof illustrating the placement of bar members within the socket base;

FIG. 9 illustrates an elongate socket base for holding the bars of the socket of FIG. 6 and increasing the forces which must be applied to part the socket formed according to FIG. 6;

FIG. 10 is an alternate embodiment of the present invention showing a rigid socket having a resilient and slotted ball member gripped therein, with the resilient ball having a plug threadably mounted therein for adjustment of the forces required to separate the tether; and, FIG. 11 is an enlarged section of FIG. 10 taken along lines 11—11 thereof.

With reference to FIG. 1, dog A is shown restricted at the end of tether B. Tether B is affixed to collar C at one end and is secured at the other end (not shown) so as to limit the radius or area through which dog A can roam. Tether member D is shown attached to collar C at 14, affixed at 15, to the remaining portion of tether B, and forms a segment of the tether which may part when excessive force is exerted thereon by dog A. As is apparent, tether member D may be affixed at any location along the length of tether B, the only requirement being that the tether member as affixed form a segment of the tether.

With reference to FIG. 2, the tether of FIG. 1 is shown enlarged and in partial section. This tether generally includes a socket member E and a ball member F grasped within the socket.

Socket member E includes a cylindrical socket body 17 threadably engaged to a socket cap 18 at outside threads 19 thereof. Socket body 17 has a circular outside periphery 20, defines concentric inward and hollow socket bore 21, and is made from a resilient material. Such materials can include spring steels or resilient plastic materials such as high molecular weight polyolefins.

Socket body 17 has a socket portion 23, which portion comprises an inside annular flange 24 restricting the diameter of socket bore 21. Flange 24 has inside tapering boundary 25 and outside tapering boundary 26. These boundaries taper at obtuse angles from and relative to the inside surface formed by socket bore 21. As will hereinafter become apparent, boundaries 25 and 26 permit ball member F to slide along their respective surfaces when insertion or withdrawal of the ball member F occurs, permitting socket body 17 to resiliently part.

Regarding this resilient parting, socket body 17 has slots 29 configured therein. Each of these slots commences at the end of the socket member having inside annular flange 24 thereat and is configured longitudinally in the length of socket body 17, terminating at points 30. Points 30 are typically located in the vicinity of socket cap 18 and permit the remaining non-slotted length of socket body 17 to support the slotted portions thereof.

Slots 29 in the socket member E of FIGS. 2 and 3 are illustrated as comprising two normally aligned grooves configured between inside annular flange 24 and points 30. As is apparent, these slots divide the socket portion of socket body 17 into four respective segments 31, 32, 33 and 34. These segments resiliently bend in accordance with the resilient properties of the material of socket body 17 and the length of the respective socket segments permitted to resiliently respond to forces tending to part the socket member E.

The lengths of the socket segments 31–34 permitted to resiliently respond can be varied. Such lengthwise variation is produced by threadably mounted sleeve 36 and locking sleeve 37. These respective sleeves 36 and 37 have an inside diameter which corresponds to the circular outside periphery 20 of socket body 17. Both the inside surface of the sleeves and outside periphery 20 are threaded for longitudinal adjustment of the sleeves along the length of the respective socket segments.

Sleeves 36 and 37 prevent the socket segments from resiliently bending outwardly from the respective locations of the sleeves along the length of socket body 17. By moving sleeves 36 and 37 towards inside annular flange 24, the length of the respective socket segment which can respond resiliently to forces exerted on the socket is decreased. This decreased length requires that a relatively short length of the respective socket segments to be deformed in permitting ball member F to pass out of its grasping relationship in the socket. As the force necessary to bend a shot section or segment of resilient material a given distance exceeds the force necessary to bend a longer segment the same distance, movement of sleeves 36 and 37 towards flange 24 will increase the force necessary to part the socket segments of the tether.

Conversely, by moving sleeves 36 and 37 away from inside angular flange 24, the length of the respective socket segments which can respond resiliently to forces exerted on the socket is increased. This increased length permits a relatively long length of the respective socket segments to be deformed in allowing ball member F to pass out of its grasping relationship in the socket. As the force necessary to bend a long section or segment of resilient material a given distance is less than the force necessary to bend a short segment the same distance, movement of sleeves 36 and 37 away from flange 24 will decrease the force necessary to part the socket segments of the tether.

Socket cap 18 is threadably secured to socket body 17 by outside threads 19 on socket body 17 and inside threads 40 interior of socket cap 18. Cap 18 in turn secures to the tether at 15 by means of link 42, which link is here shown secured to a portion of tether B.

Ball member F comprises the remaining section of self-releasing tether member D. As illustrated in FIG. 2 this member has a ball 44, shown inserted interior of cylindrical socket body 17 adjoined to inside tapering boundary 25 of inside annular flange 24. Ball 44 is here shown as a sphere having an outside diameter equal to the inside diameter of socket bore 21. This ball is typically constructed of a relatively non-resilient material such as stainless steel.

Connected to ball 44 there is shaft 45. Shaft 45 has a diameter less than the inside diameter of annular flange 24. When ball member F is inserted in socket member E, shaft 45 passes outwardly through the socket terminating in ball link 47 (here shown secured to collar C).

Having set forth the construction of self-releasing tether member D, the operation of the tether can be readily understood. Ball member F is typically inserted in socket E by moving sleeves 36 and 37 to a position remote from flange 24 and thereafter compressing the ball 44 against outside tapering boundary 26 of flange 24. As compressed, ball 44 forces the segments 31 through 34 of the socket apart and passes inwardly to a position where it is grasped by the resilient opposing segments of the socket.

When ball member F is inserted interior of socket E, sleeves 36 and 37 are positioned along the length of the socket member so as to adjust the force necessary to part the segments of the socket. Typically this force is determined by coercing animal A to pull against tether B to a limit whereby the animal normally straining against the tether cannot affect release of member D. Thereafter, the tether is left unattended; tether D is parted only when animal A exerts above normal tensional forces on the tether as a result of the animal's adrenaline and alarm reaction.

An alternate embodiment of the tether of FIGS. 1 through 3 is illustrated in FIG. 4. This tether has a socket member E' comprising a socket body 57 constructed similar to the socket embodiment of FIG. 2. Body 57 differs from socket body 17 (of FIG. 2) in that the threaded surfaces on the periphery thereof are omitted and the socket segments 31 and 33 are crossbored at apertures 59. These apertures 59 are located at preselected intervals along the length of the socket member and are utilized to vary the tensile force required to part the tether.

Socket E' is affixed interior of an elongate and hollow cap member 60. Cap member 60 has an inside diameter 62, which diameter is slightly larger than the outside periphery 20 of socket member E'. Cap member 60 has a closed end 64 at one end, an open end 65 at the other end and is crossbored at apertures 66. Similar to the socket member E' illustrated in FIGS. 1 through 3, the socket member E' of FIGS. 4 and 5 fasten to the tether B at 15.

Socket body 57 is maintained within cap member 60 by a cotter pin 68. Typically, socket body 57 is inserted interior of cap member 60 until apertures 66 of cap member 60 are in registry with selected crossbored apertures 59 of socket body 17. Thereafter cotter pin 68 is inserted through the aligned apertures 59 and 66 and flared at its inserted end to fasten the socket member and cap into a unitary socket member E'. As is apparent, by selecting aligned apertures along the length of socket body 17, the length of the respective socket segment capable of resilient response can be adjusted to vary the force necessary to withdraw ball member F.

With reference to FIGS. 6 through 9 an additional embodiment of the self-releasing animal tether is shown having a plurality of arms defining the respective segments of the socket member E".

Socket member E" includes a cap 70 having a plug 71 threadably mounted therein. Cap 70 has an inner bore 73, which bore has inside threads 74 extending along a length of the inside diameter. Threads 74 commence in the vicinity of closed end 75 of cap 70 and terminate a distance before open end 76 of the cap. At the termination of inside threads 74, the bore 73 of the cap increases in diameter and is smooth so as to define a round, smooth bore, circular in cross section.

Plug 71 is made for threadable engagement interior of cap 70; the plug is equipped with outside thread 78, which outside thread permits the plug to be rotated into and out of engagement interior of the cap. Inserted centrally of the plug along concentric plug aperture 79 there is tether connecting shaft 80, which shaft has a plug engaging flange 82 at one end and connects to tether B at 15, the opposite end.

Plug 71 has configured therein six symmetrically spaced arm slots 84. These slots, shown in section in FIG. 8, are longitudinally aligned parallel to and symmetrical about tether connecting shaft 80. Slots 84 accommodate therein the ends of socket arms 86 between the plug 71 and the inside diameter of cap 70. As can be seen, the arm slots 84 when viewed in the side elevation of FIG. 6 have an arcuate boundary 85, which boundary prevents the respective socket arms 86 from being pulled outwardly from plug 71.

Arms 86 each comprise an elongate arm body 88 having a rectangular cross section as specifically illustrated in FIG. 7. These arms 86 define an inside protrusion 90 at one end and fasten between cap 70 and plug 71 at a slot protrusion at the opposite end.

Inside arm protrusion 90, similar to the annular flange 24 illustrated in FIG. 2, defines two tapering surfaces 94 and 95 on each arm. These tapering surfaces permit the ball of ball member F to be forcibly inserted or forcibly withdrawn from the socket member so as to effect desired disengagement.

Regarding the insertion of the arms 86 interior of cap 70, the arms are typically placed in the arm slots 84 of the plug. Thereafter the plug is threadably inserted interior of the inner bore 73 of the cap 70. As threadably inserted the slot protrusions 85 of the respective arms are restricted between the arm slots 84 of the plug and the threaded bore 73 of the cap so as to maintain each arm 86 and their opposed inside arm protrusions 90 and ta- the cap 70. As spaced and extending, these respective arm 86 and their opposed inside arm protrusions 90 and tapering surfaces 94 and 95 form a segmented socket 97 into which ball member F can be inserted.

Segmented socket 97 can be adjusted in its grasping relation about ball member F in three separate ways. First, the number of arms 86 may be varied from six opposing arms down to and including three opposing arms. Such a variation will decrease the effective thickness of the segmented socket 97 which can resiliently respond to part the tether so as to permit the force of withdrawal of ball member F to be distributed over a lesser number of resilient arms 86.

Secondly, arms 86 may be varied in overall length. Such a variation is illustrated in broken lines at 99 of FIG. 6 shortening the respective arms 86. As shortened, arms 86 must resiliently respond to the withdrawal of ball member F over a shorter length, thereby increasing the force necessary to part the tether.

Thirdly, cap 70 can be replaced with a cap 71 having the smooth non-threaded segment of inner bore 73 extended immediately over the periphery of the protruding and spaced apart arms 86. The position of such an extended cap is illustrated in broken lines 98 of FIG. 6 and illustrated in full in FIG. 9. Cap 71 when installed about respective arms 86 restricts and shortens that portion of the arms which can resiliently respond to ball member F being withdrawn therefrom and correspondingly increases the force necessary to part the tether as the cap 71 is elongated.

The embodiments thus far have each illustrated a tether member having a resilient socket with an inserted and essentially non-resilient ball member F. As is apparent, ball member F may be adapted to become the resilient member of the self-releasing tether member D. Such an alternate embodiment of the instant invention is illustrated in FIGS 10 and 11.

With reference to FIG. 10, an essentially non-resilient socket member E''' is shown comprising an open end 103, a closed end 104 and having an inside flange 105 forming the opposed portions of the socket. As is apparent, socket E''' is affixed to tether B at 15 and accepts therein resilient ball member F'.

Ball member F' comprises a resilient body 107 which body fastens to cap 108 at one end and flares out to form a sphere like protrusion 109 at the opposite end. Body 107 is typically constructed of a resilient material, is circular in cross section, and defines therewithin a hollow and elongate bore 110. Bore 110 is threaded along the interior thereof with inside threads 112 which threads run the entire length of the body 107.

Resilient body 107 and its sphere like protrusion 109 must be capable of compressing to withdraw from a grasping relation interior of socket E'''. Accordingly, body 107 is slotted by normally aligned and longitudinally extending slots 114 and 115 so as to define respective segments of the sphere like protrusion 109. These respective segments permit the portions of the spherical protrusion to compressively bend or deform one towards the other to withdraw from the engaged relation interior of the non-resilient socket.

In order to provide for the adjustment of the force necessary to part tether member D of FIG. 10, resilient body 107 has threadably mounted therein a plug 117. Plug 117 is cylindrical in shape and has outside plug threads 118 for engagement with inside threads 112 of resilient body 107.

Longitudinal movement of the plug 117 interior of bore 110 is made possible by a screwdriver slot 120. Typically, when it is desired to increase the force under which ball member F' may be withdrawn from the non-resilient socket, a screwdriver is inserted from member 108 interiorly of bore 110 into engagement with slot 120 in plug 117. Thereafter, plug 117 is rotated to move towards or away from the sphere like protrusion 109, increasing or decreasing the force necessary to part the tether respectively.

Although the foregoing invention has been described in some detail by way of illustration and example for purposes of clarity and understanding, it is understood that certain changes and modifications may be practiced within the spirit of the invention as limited only by the scope of the appended claims.

What is claimed is:

1. A self-releasing device adapted to be inserted as a segment of an animal tether to enable the animal to separate and release itself by exerting tensile force on the device in excess of a predetermined amount, said device comprising: a first member having an outer end for attachment within a tether and inner end defining a ball; a second member having an inner end defining a socket and an outer end for attachment within a tether, said second member defining an inwardly extending annular flange at about said inner end for retaining the inner ball end of said first member within said second member; one of said members being divided into at least three longitudinal segments, said longitudinal segments arranged and constructed to be resiliently movable relative to one another to permit said ball to be withdrawn from within said second member upon application of tensile force in excess of said predetermined amount across the outer ends of said members; and means associated with one of said members for varying the force necessary to separate said members.

2. A device according to claim 1 and wherein said one of said members is said second member.

3. A device according to claim 2 and wherein said means comprises a restricting member mounted about the periphery of said socket segments and movable longitudinally to selected positions therealong.

4. A device according to claim 1 and wherein said one of said members is said first member.

5. A device according to claim 4 and wherein said means comprises a plug mounted between said longitudinal segments and movable to preselected positions along said segments.

6. A device according to claim 1 and wherein said socket member includes a plurality of arms; said arms having inwardly extending opposed protrusions for defining said flange.

7. A device in accordance with claim 1 where the number of segments is from three to six.

References Cited
UNITED STATES PATENTS

| | | | |
|---|---|---|---|
| 2,612,139 | 9/1952 | Collins | 119—106 |
| 3,344,487 | 10/1967 | Doutt | 24—201 |
| 3,413,692 | 12/1968 | Pressley | 24—230 |
| 3,422,502 | 1/1969 | McCarthy | 24—123 |

HUGH R. CHAMBLEE, Primary Examiner

U.S. Cl. X.R.
24—230; 119—110